Feb. 4, 1969   L. P. ENTIN   3,425,282
SUSPENSIONS FOR ACCELEROMETERS AND THE LIKE
Filed July 27, 1965
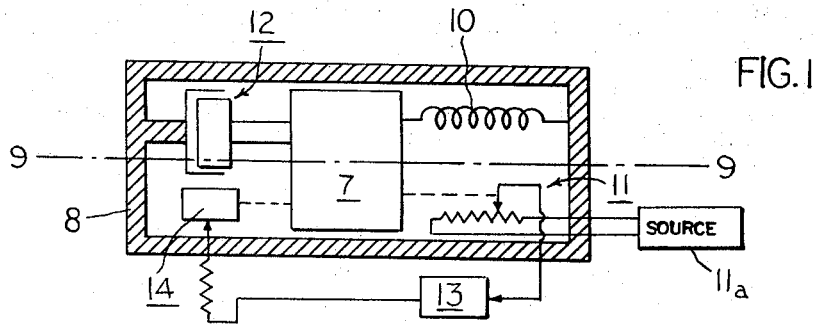
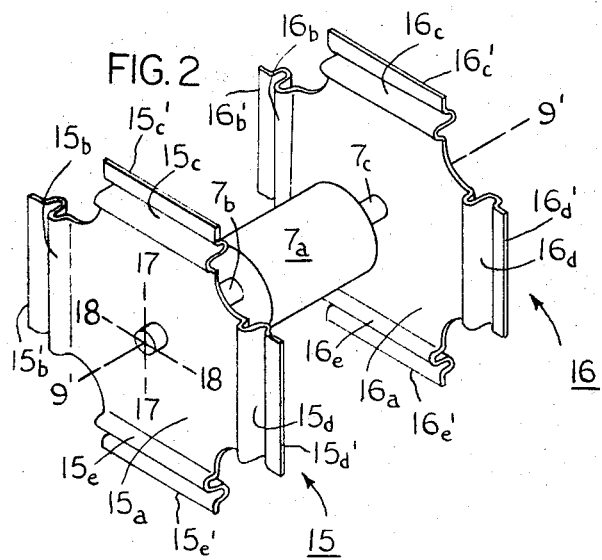
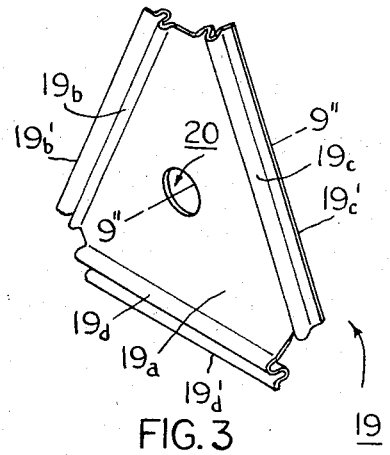
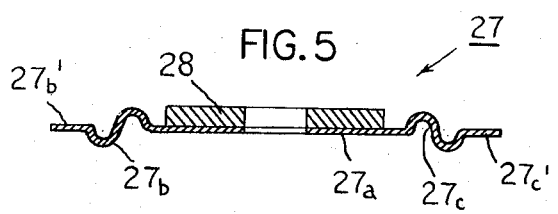
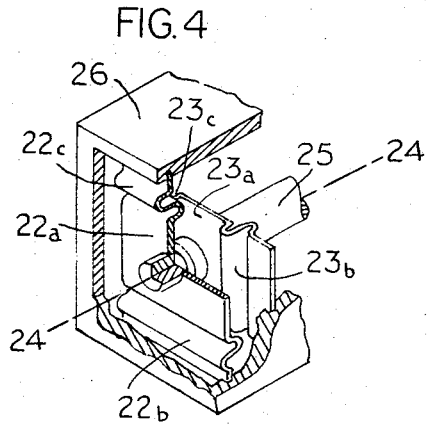
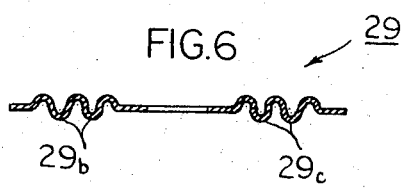
INVENTOR
LEONARD P. ENTIN
BY,
Dike, Thompson, Bronstein & Mrose
ATTORNEYS

United States Patent Office 3,425,282
Patented Feb. 4, 1969

3,425,282
SUSPENSIONS FOR ACCELEROMETERS
AND THE LIKE
Leonard P. Entin, 24 Alden Road,
Wayland, Mass. 01778
Filed July 27, 1965, Ser. No. 475,119
U.S. Cl. 73—514                    9 Claims
Int. Cl. G01p 15/00

ABSTRACT OF THE DISCLOSURE

A suspension which constrains a member to translational movements along a single axis includes a pair of axially-spaced suspension units each having a rigid central portion connected with a marginal array of at least three corrugated flexure sections in which the corrugation surfaces are defined by straight lines transverse to the axis, the flexure sections in each of the suspension units being disposed in a regular polygon configuration with discontinuities at the vertices of that configuration. Outer edges of the corrugated flexure sections are secured to a support for the member, and the latter is secured to the rigid central portions of the suspension units.

---

The present invention relates to improvements in flexible suspensions having a single axis of freedom and, in one particular aspect, to novel and improved mass suspensions for precision non-pendulous accelerometers wherein but one degree of translational freedom is afforded, along a critically-defined sensing axis, by a combination of uniquely-corrugated suspension elements which may be inexpensively fashioned in miniaturized proportions to develop stable, highly complaint, substantially frictionless, and low-hysteresis supports involving negligible cross-talk.

Instruments of the class referred to generally as "accelerometers" commonly function to sense rectilinear motion with respect to inertial space (i.e., that reference frame with respect to which Newton's laws are valid) and, by way of example, are widely exploited in the control or stabilization of vehicles and in the measurement of shock and vibration. The basic structural arrangement of such instruments is elementary, involving a seismic mass resiliently mounted for movement in relation to a support, although very often the practical designs become rather sophisticated and intricate because of the needs for special damping, servo-powdered rebalancing, deflection sensing, and so forth. In those instances when sensed accelerations are relatively steady or vary at low-frequency rates, as in the case of moving craft, the pertinent accelerometer design is likely to involve relatively large spring/mass ratios and moderate damping/spring ratios; on the other hand, the "vibrometer" variant which is intended to respond to a multiplicity of high-frequency acceleration conditions, such as linear vibrations above the natural frequency of the device, generally involves a very low spring/mass ratio and has a low damping/spring ratio. Precision operation of both versions is directly dependent upon the precision of the spring element and upon the precision with which the mass is guided in its movements relative to supporting structure. Variable friction and hysteresis effects resulting from the use of rolling or sliding bearings tend to be highly troublesome, and it has thus been sought to avoid these difficulties by resorting to resilient flexure suspensions based upon such elements as cantilever springs, spiders, and sculptured or corrugated diaphragms. Two serious complications which invariably arise have to do with the limited extend of compliance achievable in small and yet rugged elements of such types, and with unwanted cross-talk or pendulosity characteristics which evidence themselves from failure of these elements to confine the suspended mass to purely a single intended axis of freedom for rectilinear movements. In accordance with the present teachings, however, the advantageous aspects of spring-type supports are realized while, at the same time, desired degrees of compliance and substantially non-pendulous operating characteristics are developed by suspension elements which may have diminutive proportions. These benefits obtain from unique arrays of linearly-extending corrugations, hitherto known per se but differently arrayed for other purposes involving other operating characteristics, which are distinctively oriented and operationally interrelated to yield net compliance in one axial direction only.

Accordingly, it is one of the objects of the present invention to provide novel and improved suspensions of low-cost construction which accurately guide and provide low compliance for relative rectilinear movements of members along a prescribed axis without introducing frictional restraints and hysteresis non-linearities.

Another object is to provide resilient single-degree-of-freedom supports in which a plurality of flexure elements each of special corrugated form and having stiffness in a direction of elongation are uniquely arrayed with relatively movable members to promote stable frictionless guidance for the axial movements therebetween.

A further object is to provide improved accelerometer suspension units of low-cost manufacture and miniature size wherein elongated flexure portions of sinuous cross-section are uniquely arrayed and interconnected to develop a low compliance for relative movements of a seismic mass along but a single predetermined axis.

Still further, it is an object to provide compliant supports in a non-pendulous accelerometer wherein elongated convolutions of resilient material having substantially S-shaped cross-sections and high stiffness in directions of their elongations are connected in parallel between the seismic mass and its support and are oriented at angles promoting high stiffness in all directions except along intended sensing axis.

By way of a summary account of practice of this invention in one of its aspects, the seismic mass of an accelerometer is constrained to substantially pure and low-stiffness translational movements along a single axis by an axially-spaced pair of suspension units each having a stiff center portion securely connected with the mass, at axially spaced positions, and a four-section resilient outer portion connected with the spaced surrounding casing or other rigid support for the mass. Each of the resilient sections comprises an independent elongated resilient corrugation, substantially S-shaped in cross-sectional configuration, which is rigidly connected at its outer end with the casing and at its inner end with the stiff center portion of one of the suspension units. In each of the suspension units, the sinuous corrugations in each of the two pairs are disposed in parallel relationship on opposite sides of the sensing axis along which relative movement is intended to occur, and the two pairs are oriented in orthogonal relationship to cause their respective stiffnesses to prevent movements of the mass relative to the casing in all directions but those lying along the sensing axis.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

FIGURE 1 portrays the elements of a typical servo-rebalanced accelerometer system, with portions in block and schematic conventions and with the accelerometer casing longitudinally cross-sectioned to expose interior details;

FIGURE 2 is a perspective view of a non-pendulous seismic mass associated with a pair of improved low-compliance suspension units;

FIGURE 3 illustrates an alternative embodiment of a suspension unit, involving but three special elongated sinuous corrugations in a triangular array FIGURE 4 represents a partly cross-sectioned fragment of a support arrangement, such as that which may be used in an accelerometer construction, wherein the suspension unit incorporates two separately-mounted pairs of sinuous corrugated restraining elements, which are coupled in parallel between the relatively movable parts;

FIGURE 5 is a cross-section of a suspension unit having S-shaped corrugations in its restraining elements; and FIGURE 6 is a cross-section of a further suspension unit having a plurality of sinuous corrugations in each of its restraining elements.

The accelerometer arrangement depicted in FIGURE 1 includes the usual seismic mass member 7 disposed coaxially within a surrounding rigid casing 8 for relative movements therewith which, in the case of a non-pendulous type of device, should be permissable within certain narrow limits only along a precisely-defined linear sensing axis 9—9. Provisions for constrained guidance of the mass along the sensing axis are not specifically represented, although conventionally they may take the form of sleeve or rolling bearings, spiders, and diaphragms. Commonly these provisions do not constrain the relative motion to a perfectly straight line, and, instead permit movements along what is a small portion of a circular arc, such that the accelerometer is said to be pendulous and cross-coupling errors may occur as the result of undesirable responses to certain components of the sensed acceleration conditions. Schematically-illustrated spring 10 characterizes the resilient coupling of the mass with the casing, which may in some instances comprise a separately-acting or supplementary spring or which may comprise all or part of the inherent resilience of the constraining and guiding provisions. Accelerations of the casing 8 along axis 9—9 cause inertial reaction forces on seismic mass 7, and these forces act to compress or extend spring 10 such that the deflection of the seismic mass with respect to casing is proportional to the case acceleration, or some known function thereof. A transducer 11, portrayed schematically as a variably-tapped resistance and a source 11a, measures this mass deflection; its output, conveniently an electrical characteristic such as volts or ohms, is therefore proportional to the input acceleration or some known function thereof. In some instances, the transducer 11 may function to measure mass velocity. A viscous damper 12, which viscously couples mass 7 to casing 8, is commonly used to provide a reaction force proportional to and in opposition to the velocity of the mass in relation to the casing; its effect is to damp out transient oscillations and to shape the dynamic response or transfer function of the device. By proportioning the relative size of the physical constants associated with the mass 7, spring 10 and damper 12, the accelerometer can be adapted to different classes of uses, such as those wherein the input motion is DC or low frequency AC and has a net average value, and those wherein the input motion has no DC component or net average value and instead contains a multiplicity of time variant AC components (linear vibrations are typical of this class). Instruments of the first class generally have a large spring/mass ratio and moderate damping/spring ratio, and the output is essentially proportional to the acceleration of the casing with respect to inertial space. Accelerometers of the latter class, which may be termed vibrometers, generally have a spring/mass ratio which is as low as possible consistent with certain other practical considerations, such as static mass deflection, and have damping/spring ratios ranging from zero to moderate values. The natural frequency of the spring-mass system in vibrometers is preserved very low, and these devices are used for measuring vibratory motions whose lowest frequency components are somewhat above the natural frequency of the instrument. In the presence of such inputs, the seismic mass 7 tends to stand still with respect to inertial space, and the device produces an output proportional to the relative velocity of the casing and seismic mass. Accuracies of open-loop accelerometers or vibrometers are directly related to the precision of the spring 10 and transducer 11. Furthermore, the suspension constraint can be a significant source of unwanted forces, e.g., friction. The force-rebalance arrangement including servo amplifier 13 and force generator 14 is of a type widely used where higher precision than that attainable by open-loop devices is desired. Mass 7 tends to be held in equilibrium with respect to casing 8, for steady accelerations, by an inertial reaction and an opposing force-generator force.

A primary design objective in the development of accelerometers has been that of improving the mechanisms for suspending the seismic mass in relation to the casing. The desired characteristics of such guide means include non-pendulosity, low friction, low hysteresis (i.e., loss of inertial energy over a deflection cycle), low spring rate, high stiffness in directions other than along the sensing axis, small size, and stability. Presently known guide means invariably represent unfavorable compromises with respect to the desired objectives. By way of example, linear or rotational bearings introduce friction and therefore limit the sensitivity and hysteresis capabilities. Cantilever beams, and the variant known as an elastic hinge are essentially pendulous and hence crosstalk sensitive. Non-pendulous flexures are popularly of either the sculptured or corrugated diaphragm type. The former cannot be made to have the very low stiffnesses most desirable for servo-rebalanced devices, and when used in open-loop devices as both the guide means and restraint, they introduce hysteresis and linearity problems. As to the latter, it is well known that, within reasonable limitations of overall diameter and thickness, it is not possible to achieve with a circularly-corrugated diaphragm configuration compliances low enough to make it useful for either vibrometers or servo-rebalanced accelerometers.

The difficulties associated with prior designs are successfully overcome, however, through use of suspension units such as those designated by reference characters 15 and 16 in FIGURE 2. There, the seismic mass 7a of an accelerometer such as that of FIGURE 1 is supported by the units 15 and 16 at spaced positions along the sensing axis 9'—9'. Each unit comprises a generally square rigid central or hub portion, 15a and 16a, respectively, to which the mass end shafts 7b and 7c are rigidly affixed, and, at the periphery of each an array of four elongated straight corrugations having sinuous contours is formed integrally therewith (corrugations 15b–15e, and 16b–16e, respectively). These corrugations are linear and elongated and are preferably disposed as radially far out from the central accelerometer axis 9'—9' as possible. The outer edges of the corrugations (15b'–15e', and 16b'–16e', respectively) are clamped or otherwise fastened along their entire lengths (by appropriate means not shown) to the rigid case or housing, such as casing 8 (FIGURE 1) of the accelerometer assembly. The illustrated array of sinuous corrugations makes both of the support units 15 and 16 highly compliant along axis 9'—9'. In particular, the linearly-extending sinuous and separated corrugations are connected in a manner which makes the diaphragm-type units far more compliant than a comparable conventional diaphragm with circular corrugations. The essential criterion for improved accelerometers, however, is not merely high compliance (or low stiffness) along the sensing axis, but how that compares with the compliance evident in a plane transverse or perpendicular to the sensing axis. Unit 15 achieves very high translational stiffness along transverse axis 17—17 by virtue of the relatively great length of sinuous corrugations 15b and 15d in the directions of that transverse axis. Similarly, corrugations 15c and 15e provide the requisite stiffness in the directions of the perpendicular transverse axis 18—18. A single unit, such as 15, has somewhat limited torsional stiffness about the axes 17—17 and 18—18, however, but this deficiency is overcome by coupling it in parallel with the companion unit 16. The entire suspension between the mass and casing is thereby endowed with the necessary torsional and translational stiffnesses because neither diaphragm can deflect torsionally about a transverse axis without overcoming the very large translational stiffness of the other. Any force acting on the assembly in the transverse plane can be resolved into its components along axis 17—17 and 18—18 and will be found to be resisted by high stiffness. The total effect therefore is the achievement of a low stiffness, or high compliance, solely along the sensitive axis, and of a very high ratio of stiffness in the transverse plane to that along the sensitive axis. The seismic mass 7a is thus constrained to pure rectilinear motion along axis 9'—9', and, hence, errors due to pendulosity-induced crosstalk are circumvented.

In the alternative embodiment appearing in FIGURE 3, the suspension unit 19 likewise is of sheet metal or equivalent resilient material and includes a relatively rigid central or hub portion 19a with which three sinuous and elongated corrugations 19b–19d are integral near the outer periphery thereof. Outer edges 19b'–19d' of these corrugations may be brazed or otherwise fastened by well-known means to a rigid support, and the hub portion may similarly be secured to a seismic mass element with which it is fitted via the central opening 20. The three symmetrical corrugations are preferably successively offset about the sensing axis 9"—9" by an angle of about 120°, as illustrated, and the ends of each are free such that direct mechanical interactions between them will not occur. Components of high restraint in the transverse directions are present, while the desired compliance is realized in directions along the sensing axis 9"—9". At least two such units are employed in each suspension, for the same reasons explained in connection with the embodiment of FIGURE 2.

The suspension unit 21 portrayed in FIGURE 4 includes a pair of elements 22 and 23 which, together, function in the manner of either of the aforementioned units 15 and 16. Each of these elements includes a pair of substantially parallel sinuous corrugation portions (22b–22c and 23b–23c) on opposite sides of the sensing axis 24—24 and formed integrally with their respective rigid hub or center portions 22a and 23a. The two pairs of corrugations are disposed at right angles to one another, however, to develop the desired transverse stiffnesses. Both hub portions 22a and 23a are rigidly interconnected in axially-spaced relationship, at their centers, along the seismic mass shaft 25, and the outer extremities of their corrugations are clamped within the housing 26, such that the two pairs of corrugations are coupled in parallel between the shaft 25 and housing 26. A similar pair of suspension elements is preferably connected between the same relatively movable parts at some distance away. In this construction, the lengths of the corrugated portions may be made nearly equal to the internal span of the casing, without involving cut-away corners (as in FIGURES 2 and 3). Moreover, the corrugations may then be located quite near to the support axis, especially when that is desirable for reasons having to do with the mounting and operation of other parts of the accelerometer assembly.

Cross-sectional geometry of the corrugated elements may be varied to provide desired different characteristics of axial stiffness, linearity, useful deflection range, and transverse stiffness required by the particular class and range of accelerometer in which the suspension units are to be used. For an elastic-restraint accelerometer, the corrugated units can provide a moderate spring constant which will be linear over a substantial deflection range. Variation of the thickness of the corrugations enables construction of various models of the same basic accelerometer design, each with a different acceleration range capability. A useful deflection range of up to 0.1" may be required, typically. Operation of the resilient suspension units may be augmented by another axial spring, such as a coil spring, which contributes a highly linear stiffness along the accelerometer's sensitive axis but no significant added stiffness in the transverse plane. For a servo-rebalance accelerometer, the axial stiffness of the suspension should be minimized, hence, the corrugations must be very thin and shaped to be very compliant; useful deflection ranges of the suspension units need only be very small, however, generally on the order of a few thousandths of an inch. For a vibrometer, low axial stiffness is also desirable, but a large useful axial deflection, as large as up to ¼" or ½" from center, may be required.

FIGURES 5 and 6 illustrate two of the wide variety of cross-sectional configurations for suspension units which may be used in instrument applications described above. In FIGURE 5, the unit 27 is stamped from a uniformly thick resilient metal sheet and reinforced at its center or hub section 27a by being brazed or welded to a stiffening plate 28. Stiffeners (not shown) can also be provided at the outer clamping edges 27b' and 27c' of corrugations such as the S-shaped corrugations 27b and 27c. In FIGURE 6, multiple closely-spaced sinuous corrugations 29b and 29c are provided on unit 29; this will provide a high degree of axial compliance, and is highly useful in the paired arrangement of FIGURE 4. In each instance, the corrugation surfaces of the flexure sections are defined by straight lines transverse to the intended axis of relative movement. The S-shaped configuration is preferred for most applications, although it will be evident that slight modifications in shaping may produce useful results for some purposes; in general, the "rolling" effects realized with the S-shaped corrugations are superior to and involve a greater desired compliance than would result from C-shaping. The latter type of corrugations have been used in certain vibration-isolation structures, where attendant rotation about an axis is suppressed, but not in the present type of compliant single-axis-of-freedom suspensions where the corrugations are all coupled in parallel with one another and where transverse motions between the relatively-movable parts are eliminated.

It should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. A non-pendulous suspension comprising first and second relatively movable members, at least two suspension units comprising substantially the sole suspension between said first and second members in directions transverse to an axis of intended relative motion therebetween and each fixed with said members at different positions along said axis, each of said units including at least three sinuous flexure sections of resilient metal each including at least one corrugation which is substantially S-shaped in cross-section transverse to a direction of elongation thereof and in each of which flexure sections the sinuous surfaces are elongated in said direction and are defined by straight lines transverse to said axis to provide relatively high stiffness in said direction, the sinuous surfaces of at least one of said flexure sections in each of said units being disposed in non-parallel relationship with other sinuous surfaces of at least one other of said flexure sections in each of said units, the sinuous curvature of each of said surfaces being developed in direction substantially radially in relation to said axis, said flexure sections being of substantially the same elongation and disposed equi-angularly about said axis, means securing the radially innermore linear edges of said flexure sections in common with a rigid hub fixed axially in relation to said first member, and means securing the radially outermore linear edges of said flexure sections in axially fixed relation to said second member which is in surrounding radially-spaced relation to said first member, the sinuously-shaped ends of each of said flexure sections which extend between said linear edges thereof being free and unconnected with said members and with ends of the other of said flexure sections except by way of said linear edges, whereby all of said flexure sections are coupled in parallel between said first and second members and stiffly restrain relative movements between said members in all directions transverse to said axis.

2. A non-pendulous suspension comprising first and second relatively movable members, at least two suspension units comprising substantially the sole suspension between said first and second members in directions transverse to an axis of intended relative motion therebetween and each fixed with said members at different positions along said axis, each of said units including two pairs of sinuous flexure sections of resilient metal each including at least one corrugation which is substantially S-shaped in cross-section transverse to a direction of elongation thereof and in each of which flexure sections the sinuous surfaces are elongated in said direction and are defined by straight lines transverse to said axis to provide relatively high stiffness in said direction, the sinuous surfaces of at least one of said flexure sections in each of said units being disposed in non-parallel relationship with other sinuous surfaces of at least one other of said flexure sections in each of said units, the sinuous curvature of each of said surfaces being developed in direction substantially radially in relation to said axis, the sections in each of said two pairs having their elongations substantially parallel with one another and being disposed on opposite sides of said axis and having their elongations substantially perpendicular to the elongations of the flexure sections of the other of said pairs, and means securing the opposite substantially linear edges of each of said flexure sections rigidly in fixed relationship with said first and second members, respectively, along said axis, the sinuously-shaped ends of each of said flexure sections which extend between said linear edges thereof being free and unconnected with said members and with ends of the other of said flexure sections except by way of said linear edges, whereby all of said flexure sections are coupled in parallel between said first and second members and stiffly restrain relative movements between said members in all directions transverse to said axis.

3. A non-pendulous suspension as set forth in claim 2 wherein the radially innermore linear edges of the flexure sections in each of said pairs are joined in common with a rigid hub fixed axially in relation to said first member and wherein the radially outermore edges of the flexure sections are fixed axially in relation to said second member which is in surrounding radially-spaced relation to said first member.

4. A non-pendulous suspension as set forth in claim 3 wherein the radially innermore edges of the flexure sections in each of said pairs of sections are joined in common with a different rigid hub, and wherein the different hubs are fixed axially in relation to said first member at spaced positions along said axis.

5. A suspension unit for non-pendulously suspending members for relative movement along an axis of an accelerometer or the like, comprising at least three corrugated flexure sections in each of which the corrugation surfaces are defined by substantially straight lines transverse to a predetermined axis and substantially normal to a different radius from said predetermined axis, each of said flexure sections including at least one elongated corrugation which is substantially S-shaped in cross-section transverse to the direction of elongation thereof, and substantially rigid central hub means joined with the radially innermore linear edges of all of said flexure sections, said flexures of substantially the same elongation being disposed equi-angularly about said predetermined axis with their radially innermore linear edges joined integrally in common with said substantially rigid hub means, the radially outermore linear edges of all of said flexure sections and the corrugated ends of said flexure sections being free, and the corrugated surfaces of at least one of said flexure sections being in non-parallel relationship with other corrugation surfaces in the unit.

6. A suspension unit for non-pendulously suspending members for relative movement along an axis of an accelerometer or the like, comprising at least three corrugated flexure sections in each of which the corrugation surfaces are defined by substantially straight lines transverse to a predetermined axis and substantially normal to a different radius from said predetermined axis, each of said flexure sections including at least one elongated corrugation which is substantially S-shaped in cross-section transverse to the direction of elongation thereof, and substantially rigid central hub means joined with the radially innermore linear edges of all of said flexure sections, two flexure sections in each of two pairs of said sections having their elongations substantially parallel with one another and being disposed on opposite sides of said predetermined axis and having their elongations substantially perpendicular to the elongations of the flexure sections of the other of said pairs, the radially outermore linear edges of all of said flexure sections and the corrugated ends of said flexure sections being free, and the corrugated surfaces of at least one of said flexure sections being in non-parallel relationship with other corrugation surfaces in the unit.

7. A suspension unit as set forth in claim 6 wherein the radially innermore linear edges of the flexure sections in each of said pairs are joined in common with said hub means, and wherein said hub means includes sheet metal integral as one piece with corrugated sheet metal forming said flexure sections.

8. An accelerometer comprising a seismic mass supported with respect to a casing by two axially-spaced sheet-metal suspension units, each of said units including a substantially rigid and flat hub section affixed to the seismic mass along the sensing axis thereof and at least three substantially flat rigid outer sections affixed to said casing, said outer sections each being integrally connected to said hub section by a different one of at least three corrugated flexure sections, said flexure sections containing corrugations which are substantially linear and have surfaces defined by the locus of long parallel straight line elements which are substantially parallel with said flat rigid sections and perpendicular to a compliant axis of the units extending in the directions of said sensing axis, said flexure sections of each of said units being disposed about said hub section to form a regular polygon configuration with discontinuities at the vertices thereof.

9. An accelerometer comprising a seismic mass supported with respect to a casing by two axially-spaced pairs of sheet-metal suspension, the suspensions in each of said pairs being closely spaced with respect to one another, each of said suspensions including a rigid and substantially flat central section affixed to the seismic mass along the sensing axis thereof and two substantially rigid and flat outer sections affixed to said casing, said outer sections each being integrally connected to said central section by a different one of two elongated corrugated flexure sections, said flexure sections containing corrugations which are substantially linear and have surfaces defined by the locus of long parallel straight line elements which are substantially parallel with said flat rigid sections and perpendicular to a compliant axis of the suspension extending in the directions of said sensing axis, said flexure sections on one of said suspensions being arranged with their axes of elongation parallel to each other and equally spaced on opposite sides of the central axis and perpendicular to the axes of elongation of the flexure section of the other suspension in the pair.

References Cited

UNITED STATES PATENTS

| | | | |
|---|---|---|---|
| 2,974,531 | 3/1961 | Ackerman | 73—516 |
| 3,020,505 | 2/1962 | Bourns et al. | 73—517 XR |
| 3,075,100 | 1/1963 | Efromson | 267—1 |

JAMES J. GILL, *Primary Examiner.*

U.S. Cl. X.R.

267—1